United States Patent
Burnett et al.

(10) Patent No.: US 11,973,861 B2
(45) Date of Patent: Apr. 30, 2024

(54) SECURE KEY GENERATION

(71) Applicants: Benjamin Adams Burnett, San Diego, CA (US); Calvin Bansal Stanley, Paeonian Springs, VA (US); Lisa P. Happel, Poway, CA (US); Jonathan E. Green, Encinitas, CA (US)

(72) Inventors: Benjamin Adams Burnett, San Diego, CA (US); Calvin Bansal Stanley, Paeonian Springs, VA (US); Lisa P. Happel, Poway, CA (US); Jonathan E. Green, Encinitas, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 261 days.

(21) Appl. No.: 17/667,832

(22) Filed: Feb. 9, 2022

(65) Prior Publication Data
US 2023/0254134 A1  Aug. 10, 2023

(51) Int. Cl.
*H04L 9/08* (2006.01)
*H04L 9/14* (2006.01)
*H04L 9/32* (2006.01)

(52) U.S. Cl.
CPC .......... *H04L 9/0858* (2013.01); *H04L 9/0861* (2013.01); *H04L 9/14* (2013.01); *H04L 9/3236* (2013.01)

(58) Field of Classification Search
CPC ....... H04L 9/0858; H04L 9/0861; H04L 9/14; H04L 9/3236; H04L 2209/046; H04L 9/0891
See application file for complete search history.

(56) References Cited

U.S. PATENT DOCUMENTS 8,340,298 B2  12/2012  Gelfond et al.
8,650,401 B2   2/2014  Wiseman et al.
(Continued)

FOREIGN PATENT DOCUMENTS

| CN | 113612601 A | 11/2021 |
| TW | 201705782 A | 2/2017 |
| TW | 202127822 A | 7/2021 |

OTHER PUBLICATIONS

Basuchowdhuri: "Classical Authentication Aided Three-Stage Quantum Protocol"; Cornell University; arXiv: cs/0605083v1 [cs.CR]; May 18, 2006; found on the internet at https://arxiv.org/abs/cs/0605083 on Jan. 31, 2022.

(Continued)

*Primary Examiner* — Sm A Rahman
(74) *Attorney, Agent, or Firm* — Tarolli, Sundheim, Covell & Tummino LLP

(57) ABSTRACT

A key updater for a first party operating on a network generates a mutually distilled key for communication between the first party and a second party. The key updater determines a set of verifying parties operating on the network needed to authenticate the mutually distilled key, wherein each verifying party of the set of verifying parties operates on the network. The key updater iteratively executes a key equivalency test for each verifying party in the set of verifying parties to determine a nonce sum until the key equivalency test has been executed for each of the verifying parties in the set of verifying parties or until it is determined that at least one node on the network has been compromised. The key updater generates a final key for communication between the first party and the second party based on the nonce sum and the mutually distilled key.

20 Claims, 7 Drawing Sheets

(56) References Cited

U.S. PATENT DOCUMENTS

| | | | |
|---|---|---|---|
| 8,885,828 | B2 | 11/2014 | Wiseman et al. |
| 9,503,257 | B2 | 11/2016 | Yoshimichi |
| 10,742,420 | B1 | 8/2020 | Griffin |
| 11,070,366 | B2 * | 7/2021 | Soriente ............... H04L 9/3226 |
| 2003/0026433 | A1 | 2/2003 | Matt |
| 2006/0179319 | A1 * | 8/2006 | Krawczyk ............ H04L 9/3247 |
| | | | 713/180 |
| 2010/0098247 | A1 | 4/2010 | Suumaki |
| 2012/0328290 | A1 | 12/2012 | Yuan et al. |
| 2015/0046695 | A1 | 2/2015 | Philipsz |
| 2018/0350180 | A1 * | 12/2018 | Onischuk ............... G07C 13/00 |
| 2019/0104121 | A1 | 4/2019 | Khandani |
| 2020/0177563 | A1 | 6/2020 | Huapaya et al. |

OTHER PUBLICATIONS

Li, et al.: "Quantum Blockchain: A decentralized, Encrypted and Distributed Database Based on Quantum Mechanics"; Journal of Quantum Computing; Henderson vol. 1, Iss. 2, (2019): 49-63. DOI:10.32604/jqc.2019.06715; found on the internet at https://www.proquest.com/docview/2395850539.

Abdullah: "Modified Quantum Three Pass Protocol Based on Hybrid Cryptosystem"; Institute of Graduate Studies and Research, Eastern Mediterranean university, Oct. 2015; found on the internet at http://i-rep.emu.edu.tr:8080/xmlui/bitstream/handle/11129/2327/abdullahalharith.pdf?sequence=1.

Wu: "One-Time Pad Cipher Based on Out-Key Distribution"; Int'l Conf. Wireless Networks (ICWN'14); found on the internet at https://www.semanticscholar.org/paper/One-time-Pad-Cipher-Based-on-Out-Key-Distribution-Wu/f7eca2a94435c7241da2042cc7ea513f168d1cb1.

International Search Report and Written Opinion for corresponding PCT/US2023/010547, dated May 12, 2023, pp. 1-9.

Office Action and English translation for corresponding TW112101626; issued Nov. 24, 2023.

* cited by examiner

SECURE KEY GENERATION

TECHNICAL FIELD

The present disclosure relates to computer security. More particularly, this disclosure relates to a system and method for securely generating a key.

BACKGROUND

In cryptography, Quantum key distribution (QKD) is a secure communication method which implements a cryptographic protocol involving components of quantum mechanics. QKD enables two parties to produce a shared random secret key known only to them, which can then be used to encrypt and decrypt messages. QKD enables the two communicating users to detect the presence of any third party trying to gain knowledge of the key. This benefit stems from a fundamental aspect of quantum mechanics, namely the process of measuring a quantum system in general disturbs the system. A third party trying to eavesdrop on the key must in some way measure it, thus introducing detectable anomalies. By using quantum superpositions or quantum entanglement and transmitting information in quantum states, a communication system can be implemented that detects eavesdropping. If the level of eavesdropping is below a certain threshold, a key can be produced that is guaranteed to be secure (e.g., the eavesdropper has no information about it), otherwise no secure key is possible and communication is aborted.

A hashing function is any function that can be used to map data of arbitrary size to fixed-size values. The values returned by a hashing function are called hash values, hash codes, digests, or simply hashes. The values are usually used to index a fixed-size table called a hash table. Use of a hashing function to index a hash table is called hashing or scatter storage addressing.

SUMMARY

One example relates to a non-transitory machine readable medium having machine executable instructions comprising a key updater for a first party operating on a network. The key updater generates a mutually distilled key for communication between the first party and a second party and determines a set of verifying parties operating on the network needed to authenticate the mutually distilled key, wherein each verifying party of the set of verifying parties operates on the network. The key updater iteratively executes a key equivalency test for each verifying party in the set of verifying parties to determine a nonce sum until the key equivalency test has been executed for each of the verifying parties in the set of verifying parties or until it is determined that at least one node on the network has been compromised. The key updater generates a final key for communication between the first party and the second party based on the nonce sum and the mutually distilled key if the key equivalency test was successfully executed for each verifying party of the set of verifying parties.

Another example relates to a system for updating a key. The system includes a non-transitory memory having machine readable instructions and a processing unit for accessing the machine readable instructions. The machine readable instructions include a key authenticator for a verifying party to verify a mutually distilled key generated for communication between a first party and a second party. The key authenticator receives a first encrypted hash of the mutually distilled key from the first party that is only decryptable with a first key of a key set for communication between the first party and the verifying party. The authenticator also receives a second encrypted hash of the mutually distilled key from the second party that is only decryptable with a first key of a key set for communication between the verifying party and the second party. The key authenticator decrypts the first encrypted hash of the mutually distilled key to reveal a first hash of the mutually distilled key. The key authenticator further decrypts the second encrypted hash of the mutually distilled key to reveal a second hash of the mutually distilled key and encrypts a nonce value with different keys to provide a first encrypted nonce value that is only decryptable with a second key of the key set for communication between the verifying party and the first party and a second encrypted nonce value that is only decryptable with a second key of the key set for communication between the verifying party and the second party if the first hash of the mutually distilled key is equal to the second hash of the mutually distilled key. The key authenticator transmits a notification to the first party and the second party that at least one node on a network has been compromised if the first hash of the mutually distilled key is not equal to the second hash of the mutually distilled key.

Yet another example relates to a method for verifying a key that includes generating, by a first computing device for a first party and by a second computing device for a second party a mutually distilled key for communication between the first party and a second party. The method also includes determining, by the first computing device and the second computing device a number of verifying parties operating on a network needed to authenticate the mutually distilled key, wherein each verifying party of the verifying parties operates on the network. The method further includes iteratively executing a key equivalency test for each of the verifying parties to determine a nonce sum until the key equivalency test has been executed for each of the verifying parties or until it is determined that at least one node on the network has been compromised. For each iteration of the key equivalency test, the first computing device and the second computing device select a verifying party of the verifying parties to provide a selected verifying party and receive a first encrypted nonce value from the selected verifying party. The first encrypted nonce value received at the first computing device is only decryptable with a first key of a key set for communication between the first party and the selected verifying party and the first encrypted nonce value received at the second computing device is only decryptable with a first key of a key set for communication between the second party and the verifying party. The first computing device and the second computing device receive an encrypted hash of a nonce value, wherein the encrypted hash of the nonce value received at the first computing device is only decryptable with a first key of a key set for communication between the first party and the second party and the encrypted hash of the nonce value received at the second computing device is only decryptable with a second key of the key set for communication between the first party and the second party. The first computing device and the second computing device also decrypt the nonce value and the encrypted hash of the nonce value to reveal a first nonce value and a hash of a second nonce value and hash the first nonce value to provide a hash of the first nonce value. The first computing device and the second computing device add the first nonce value to the nonce sum if the hash of the first nonce value is equal to the hash of the second nonce value or determines that at least one node on the network has been compromised if the hash of the first nonce value does not equal the hash of the second nonce value. The method further includes generating, at the first computing device and the second computing device, a final key for communication between the first party and the second party based on the nonce sum if the key equivalency test was successfully executed for each of the verifying parties of the set of verifying parties.

DETAILED DESCRIPTION

Figure 1:
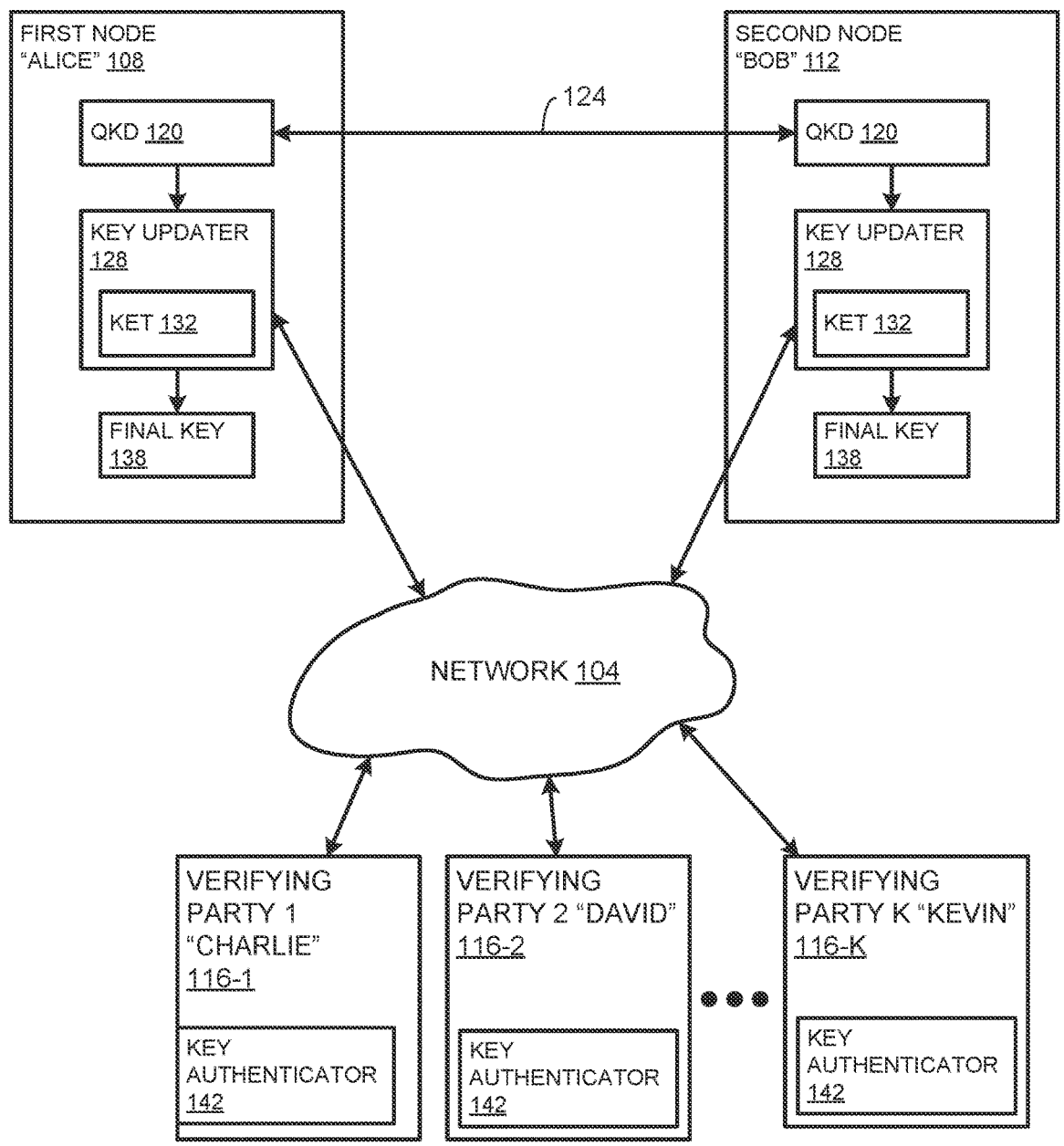
FIG. 1 illustrates a system for securely authenticating encryption keys.

This description is related to securely authenticating and generating encryption keys in a network environment. The process is initiated after a mutually distilled key between two parties, which two parties are operating nodes of the network are referred to as "Alice" and "Bob" (consistent with industrial standard nomenclature) is generated. Alice and Bob are representative of computing devices that operate as communication endpoints. Alice and Bob can be operated as user workstations, servers, mobile devices, Internet of Things (IoT) devices, etc. The mutually distilled keys exchanged between Alice and Bob can be symmetric keys or asymmetric keys. In some examples, the mutually distilled keys can be generated using quantum key distribution (QKD) between Alice and Bob.

To initially authenticate the mutually distilled key, Alice and Bob each execute a hashing function on the mutually distilled key and encrypt the resulting hash using another key (previously authenticated) of a key set to each other. Alice and Bob then decrypt the encrypted hash and compare the decrypted version with the version transmitted to the other party to verify that Alice and Bob have the same mutually distilled key. As a summary, Alice would (i) hash the mutually distilled key, (ii) encrypt the hash and (ii) transmit the encrypted hash to Bob. Alice would (iv) receive an encrypted hash from Bob (v) decrypt the encrypted hash to reveal a decrypted hash. Thus, Alice (vi) compares the hash (executed on the mutually distilled key) with the decrypted hash, and if the hash and the decrypted hash are equal, Alice can be assured that Bob has a copy of the mutually distilled key.

Assuming that Alice and Bob were able to verify that both parties possess the mutually distilled key, Alice and Bob execute a key equivalency test (KET) on the mutually distilled key. In the KET, Alice and Bob each execute a hash on the mutually distilled key and encrypt the hash using previously authenticated keys and transmit the encrypted hash to a third party operating a node (a communication endpoint) of the network, referred to as "Charlie." That is, both Alice and Bob have different keys that have been authenticated for communication with Charlie, and these keys are used to encrypt the hashes of the mutually distilled key. Charlie decrypts the encrypted hash sent from both Alice and Bob, and compares the decrypted hashes. If the hashes are equal, the KET for the verification process continues.

Assuming that the KET continues, Charlie generates a nonce value (a random number) and encrypts the nonce value using previously authenticated keys for Alice and Bob. Charlie transmits the encrypted nonce value to both Alice and Bob. Alice and Bob decrypt the nonce values to reveal decrypted nonce values. Alice and Charlie then hash the decrypted nonce values and then encrypt the hash of the decrypted nonce values and transmit the encrypted hashes to each other for comparison. As a summary, Alice would (i) receive an encrypted nonce value from Charlie and (ii) decrypt the encrypted nonce value to reveal a decrypted nonce value. In response, Alice would (iii) hash the decrypted nonce value, (iv) encrypt the resultant hash and (v) transmit the encrypted hash to Bob. Alice would also (vi) receive an encrypted hash from Bob, (vii) decrypt the encrypted hash to reveal a decrypted hash. Alice could then (viii) compare the decrypted hash with the hash of the decrypted nonce value. If these values are equal, the KET for the mutually distilled key is completed, and the key verification is also completed. After completing the KET for the mutually distilled key, Alice and Bob can calculate a nonce sum of the decrypted nonce value. Alice and Bob can apply the mutually distilled key and the nonce sum on a Key Derivation Function to arrive at a Final Key. This Final Key can be stored and used for subsequent communication (e.g., network traffic or overhead, such as further key authentication). By employing the KET, a third party, namely Charlie, authenticates Alice and Bob to prevent identity spoofing of Alice or Bob. Moreover, in many situations, a fourth party operating a node (e.g., another communication endpoint) on the network (often referred to as "David") could operate in the same manner as Charlie to further prevent such identity spoofing. Furthermore, in the examples provided, Alice, Bob, Charlie and David are each peers of the network. That is, there is no requirement that Alice, Bob, Charlie and/or David have any special privileges and/or hardware for executing the KET. Moreover, the KET can be employed for nearly any type of encryption scheme, including one time pad (OTP) and/or a conventional symmetric algorithm.

FIG. 1 illustrates a system 100 for securely authenticating encryption keys (referred to simply as "keys"). The system 100 includes nodes that communicate on a network 104 (e.g., a network). The network 104 can be, for example, a public network (e.g., the Internet), a private network (e.g., a local area network or a cellular network) or a combination thereof (e.g. a virtual private network).

In FIG. 1, there are five (5) nodes on the network 104. However, in other examples, there could be more or less nodes on the network 104. Communications on the network 104 represent classical channels (e.g., a electrical and/or optical communication channels) between nodes. Each node on the network 104 is a communication endpoint, such as a computing device. More particularly, each node on the network 104 represents a non-transitory machine readable memory that stores machine executable instructions and a processing unit that accesses the non-transitory memory and executes the machine executable instructions. In the example provided, the nodes include a first node, "Alice" 108 and a second node "Bob" 112, referring to fictional characters, consistent with standard industry nomenclature. The nodes on the network 104 also include K number of verifying parties 116, where K is an integer greater than or equal to one (1). Each verifying party includes an index number, i. Accordingly, the first verifying party 116-1 is referred to as a fictional character, "Charlie" (e.g., Charlie 116-1) for purposes of simplification of explanation. Similarly, the second verifying party 116-2 is referred to as a fictional character "David" (e.g., David 116-2), and the Kth verifying party 116-K is referred to as a fictional character "Kevin" (e.g., Kevin 116-K).

Alice 108 and Bob 112 include a quantum key distribution (QKD) module 120 executing thereon. The QKD module 120 of Alice 108 and the QKD module 120 of Bob 112 operate in concert to establish a quantum channel 124 between Alice 108 and Bob 112. The quantum channel 124 is employable to leverage quantum techniques to generate a mutually distilled key (or multiple mutually distilled keys) between Alice 108 and Bob 112 that cannot be determined by an eavesdropping party (often referred to as "Eve") due to the laws of physics. That is, both Alice 108 and Bob 112 are assured that the mutually distilled key is only possessed by Alice 108 and Bob 112. To initially authenticate the mutually distilled key, Alice 108 and Bob 112 each execute a hashing function on the mutually distilled key and encrypt the resulting hash using another key (previously authenticated) of a key set to each other. Alice 108 and Bob 112 then decrypt the encrypted hash and compare the decrypted version with the version transmitted to the other party to verify that Alice 108 and Bob 112 have the same mutually distilled key. However, conventionally, there is no way to ensure that the first node 108 or the second node 112 are being spoofed by a hacker. Stated differently, in conventional systems, there is no way to determine if a hacker operating a node referred to as "Fake Bob" is spoofing the identity of the second node 112.

To address this problem, Alice 108 and Bob 112 execute a key updater 128 (e.g., a software module) that employs a key equivalency test (KET) 132 to leverage trusted communications with a selected number of the verifying parties 116 to authenticate the mutually distilled key and to generate a final key 138 that is employable for communications through the network 104 (e.g., classical channels). Unless otherwise stated, the keys described herein are symmetric encryption keys. That is, a given key is employable to encrypt data that is only decryptable with the given key. Accordingly, the final key 138 is employable to encrypt or decrypt data, such that the final key 138 is a symmetric encryption key.

Figure 2:
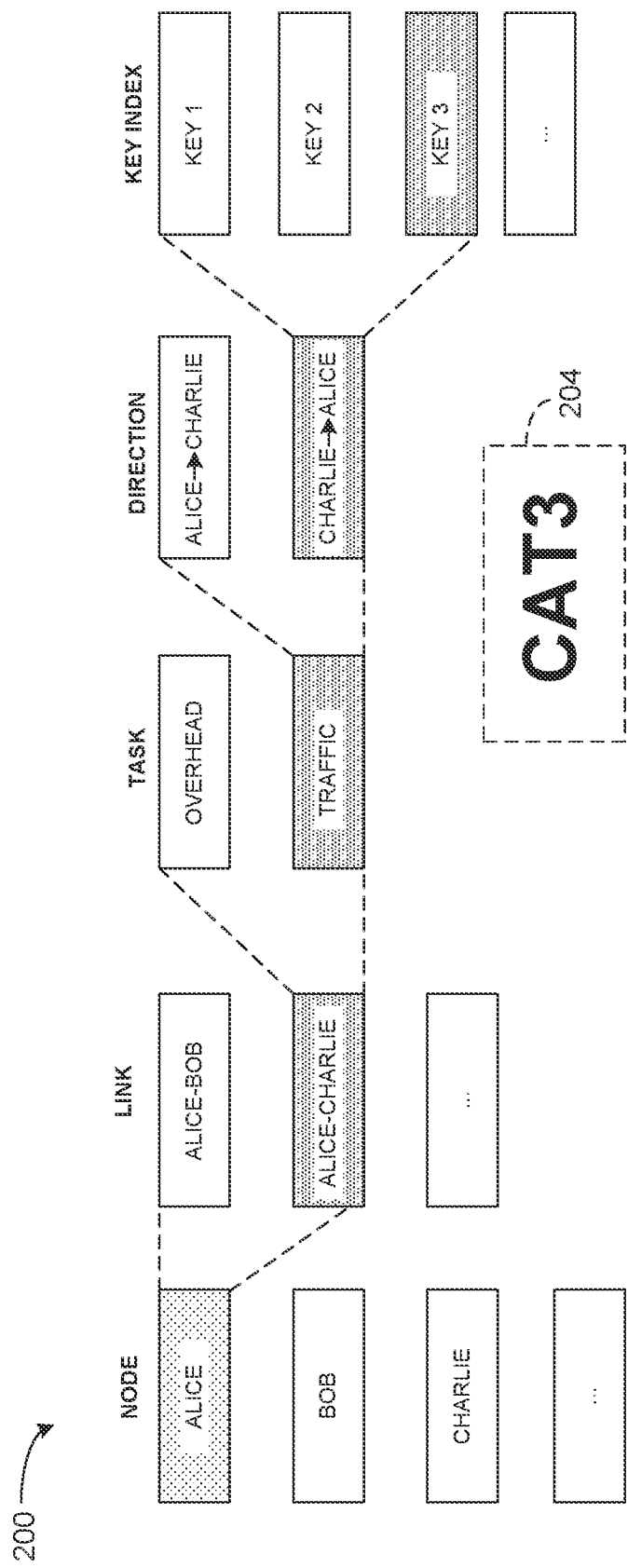
FIG. 2 illustrates a chart that demonstrates an example of an architecture of encryption keys.

FIG. 2 illustrates a chart 200 that demonstrates the architecture of the keys employed by the system 100 of FIG. 1. For purposes of simplification of explanation, the same nomenclature (e.g., Alice, Bob and Charlie) are employed in FIGS. 1 and 2 to denote the same nodes. The chart 200 demonstrates a naming convention for a key 204 labeled "CAT3".

The chart 200 includes a column labelled "NODE" that identifies each node on the network (e.g., the network 104 of FIG. 1). The selected node (Alice) is highlighted. The chart 200 includes a column labeled "LINK" with a highlighted textbox that identifies the selected node (Alice) and the node the selected node is communicating with (Charlie, in the illustrated example) for the key 204. Additionally, the chart 200 includes a column labeled "TASK" with a highlighted box to identify the task designated for the key 204 (traffic, in the illustrated example). Further, the chart 200 includes a highlighted textbox describing the communication direction of the key 204 (Charlie to Alice, in the illustrated example). Further still, the chart 200 has a column labeled "KEY INDEX" that includes a key index number of the key 204.

Thus, in the illustrated example, the nomenclature CAT3 uniquely describes the third key ('3' of the CAT3) key held by Alice for communicating traffic ('T' of the CAT3) transmitted from Charlie to Alice ('CA' of the CAT3). Conversely, the complementary key of a key set at Alice for transmitting traffic from Alice to Charlie would be ACT3.

As a different example, a second key of keys at Bob for communicating overhead from Alice to Bob would be ABO2. Similarly, the complementary key at Bob for communicating overhead from Bob to Allice would be BAO2. Thus, as demonstrated, the key name (such as the key 204) is employable as shorthand to understand how the keys of operate. Each of these keys, namely, ABO2 and BAO2 are symmetric encryption keys that are employable as examples of the final key 138 of FIG. 1.

Referring back to FIG. 1, as noted in response to generating the mutually distilled key, the key updater 128 employs the KET module 132 to authenticate the mutually distilled key and to generate the final key 138. The key updater 128 determines a set of the verifying parties 116 needed to authenticate the mutually distilled key, wherein each verifying party 116 of the set of verifying parties 116 operates on the network 104. The KET module 132 iteratively executes a KET for each of the determined set of verifying parties 116 to determine a nonce sum until either the KET has been successfully executed for each of the set of verifying parties 116 or until it is determined that at least one node on the network 104 has been compromised. During each iteration of the KET, the key updater 128 of Alice 108 and Bob 112 communicates with a key authenticator 142 executing on a corresponding verifying party 116. The key authenticator 142 can be, for example, a module of a key updater similar to the key updater 128 of Alice 108 and Bob 112 or a separate module.

In a first example, (hereinafter the "first example"), it is presumed that the key updater 128 determines that the first and second verifying parties 116, namely, Charlie 116-1 and David 116-2 are needed to verify the mutually distilled key. In the first example, the KET module 132 executes the KET for the mutually distilled key with both Charlie 116-1 and David 116-2 in sequence or in parallel.

Figure 3:
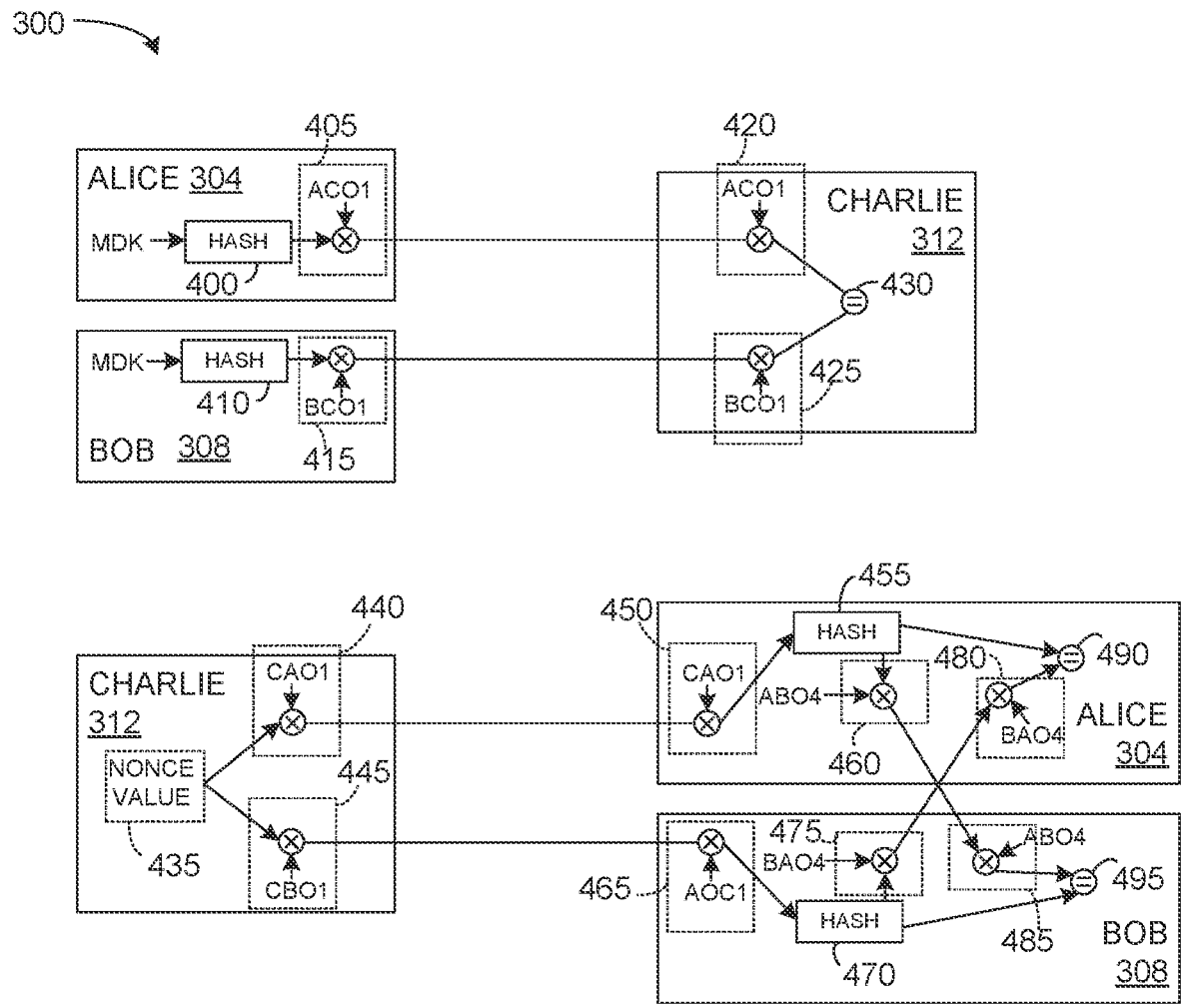
FIG. 3 illustrates a diagram of an example of an iteration of a key equivalency test (KET).

FIG. 3 illustrates a diagram of a system 300 executing a method depicting operations during the first example, wherein an iteration of the KET is executed by the KET module 132 of Alice 304 (e.g., Alice 108 of FIG. 1) and Bob 308 (112 of FIG. 1). In the method, it is presumed that the key updater of Alice 304 and Bob 308 has selected Charlie 312 (e.g., Charlie 116-1 of FIG. 1) for an iteration of the KET. At 400, Alice 304 (e.g., the KET module 132 of Alice 108 of FIG. 1) executes a hashing function on the mutually distilled key (labeled MDK in FIG. 3) between Alice 304 and Bob 308 to provide a first hash of the mutually distilled key. As used herein, a hash refers to a particular one-way encryption function (e.g., a non-decryptable function). Stated differently, it is presumed throughout this disclosure that each reference to a hashing function, or "hashing", and its derivatives, refers to the same hashing function, such that the same input to the hashing function results in the same output. At 405, Alice 304 (e.g., the KET module 132 of Alice 108 of FIG. 1) encrypts the first hash of the mutually distilled key with key ACO1 to provide a first encrypted hash of the mutually distilled key. Alice 304 transmits the first encrypted hash of the mutually distilled key to Charlie 312. In reference to FIG. 2, the key identifier ACO1 refers to Alice's key that is employable to communicate overhead to Charlie 312, with a key index of 1. Thus, the encrypted hash of the mutually distilled key can only be decrypted with key ACO1.

At 410, Bob 308 employs the hashing function to hash the mutually distilled key to provide a second hash of the mutually distilled key. At 415, Bob 308 encrypts the second hash of the mutually distilled key with key BCO1 to provide a second encrypted hash of the mutually distilled key that is only decryptable with key BCO1. The second encrypted hash of the mutually distilled key is transmitted to Charlie 312.

At 420, Charlie (executing a key authenticator, such as the key authenticator 142 of FIG. 1) decrypts the first encrypted hash of the mutually distilled key provided from Alice 304 using key ACO1 to reveal the first hash of the mutually distilled key. At 425, Charlie (again, executing the key authenticator) decrypts the second hash of the mutually distilled key using key BCO1 to reveal the second hash of the mutually distilled key. At 430, the key authenticator of Charlie compares the first hash of the mutually distilled key with the second hash of the mutually distilled key. If the first hash of the mutually distilled key is equal to the second hash of the mutually distilled key, the KET continues. Conversely, if the first hash of the mutually distilled key is unequal to the second hash of the mutually distilled key, Charlie 312 provides a notification to Alice 304 and Bob 308 (and/or to another node) indicating that one or more nodes of the network may have been compromised, and the iteration of the KET fails.

If the KET continues (successful comparison at 430), at 435, the key authenticator of Charlie 312 generates a nonce value (e.g., a cryptographic nonce value, such as an integer value). At 440, the key authenticator of Charlie 312 encrypts the nonce value using key CAO1 (Charlie's 312 first key for transmitting overhead data Alice 304) to provide a first encrypted nonce value that is only decryptable with the key CAO1. Charlie transmits the first encrypted nonce value to Alice 304. At 445, the key authenticator of Charlie 312 encrypts the nonce value using key CBO1 (Charlie's 312 first key for transmitting overhead data from Charlie 312 to Bob 308) to provide a second encrypted nonce value. Charlie 312 transmits the second encrypted nonce value to Bob 308.

At 450, the KET module of Alice 304 employs key CAO1 to decrypt the first encrypted nonce value to reveal a first nonce value (which should be equal to the nonce value generated by Charlie at 435 prior to encryption). At 455, the first nonce value is hashed with the hashing function to provide a first hash of the nonce value. At 460, the first hash of the nonce value is encrypted with key ABO4 (Alice's 304 fourth key to communicate overhead data from Alice 304 to Bob 308) to provide a first encrypted hash of the nonce value. The KET module of Alice 304 transmits the first encrypted hash of the nonce value to Bob 308. Similarly, at 465, the KET module of Bob decrypts the second encrypted nonce value to reveal a second nonce value (which should be equal to the nonce value generated by Charlie 312 at 435 prior to encryption). At 470, the KET module of Bob 308 hashes the second nonce value with the hashing function to provide a second hash of the nonce value. At 475, the second hash of the nonce value is encrypted with key BAO4 (Bob's 308 fourth key for communicating overhead data from Bob 308 to Alice 304) to provide a second encrypted hash of the nonce value.

At 480, the KET module of Alice 304 employs key BAO4 to decrypt the second encrypted hash of the nonce value to reveal the second hash of the nonce value. At 485, the KET module of Bob 308 decrypts the first encrypted hash of the nonce value to reveal the first hash of the nonce value. At 490, the KET module of Alice 304 compares the first hash of the nonce value to the second hash of the nonce value. If the first hash of the nonce value is equal to the second hash of the nonce value, the iteration of the KET has passed for Alice 304, and the first hash of the nonce value (or the second hash of the nonce value, because they are equal) is added to a nonce sum value. Conversely, if the first hash of the nonce value is unequal to the second hash of the nonce value, Alice 304 generates a notification that at least one node on the network may be compromised, and the iteration of the KET fails. The notification can be provided to Bob 308, Charlie 312 and/or another node of the network.

Similarly, at 495, the KET module of Bob 308 compares the first hash of the nonce value to the second hash of the nonce value. If the first hash of the nonce value is equal to the second hash of the nonce value, the iteration of the KET has passed for Bob 308, and the nonce value is added to a nonce sum value. Conversely, if the first hash of the nonce value is unequal to the second hash of the nonce value, Bob 308 generates a notification that at least one node on the network may be compromised, and the iteration of the KET fails. The notification can be provided to Alice 304, Charlie 312 and/or another node of the network.

Figure 4:
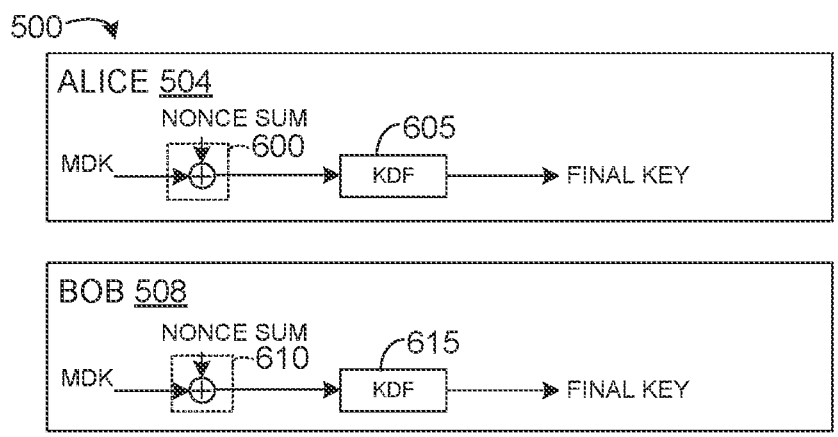
FIG. 4 illustrates a diagram of generation of a final key.

Referring back to FIG. 1, the KET module 132 executes an iteration of the KET using a method similar to that shown in FIG. 3 or each determined verifying party 116-1. If each iteration of the KET is successful, the key updater 128 of Alice 108 and Bob 112 will both have a nonce sum that is equal. That is, the nonce sum of the key updater 128 of Alice 108 will be equal to the nonce sum of the key updater 128 of Bob 112. In response to generating the nonce sum, the key updater 128 of Alice 108 and of Bob 112 employ the nonce sum and the mutually distilled key to generate the final key 138. FIG. 4 illustrates this process. More particularly, FIG. 4 illustrates a system 500 executing a method for the first example, wherein the key updater (e.g., the key updater 128 of FIG. 1) of Alice 504 (e.g., Alice 108 of FIG. 1) and Bob 508 (e.g., Bob 112 of FIG. 1) have successfully executed each iteration of the KET and generated the nonce sum. At 600, the key updater of Alice 504 combines the mutually distilled key (labeled "MDK") and the nonce sum with the XOR function to provide a combination of the nonce sum and the mutually distilled key. At 605, the key updater of Alice 504 executes a key derivation function (KDF) to convert the combination of the nonce sum and the mutually distilled key into a final key (e.g., the final key 138 of FIG. 1). Similarly, at 610, the key updater of Bob 508 combines the mutually distilled key (labeled "MDK") and the nonce sum with the XOR function to provide a combination of the nonce sum and the mutually distilled key. At 615, the key updater of Alice 504 executes a KDF to convert the combination of the nonce sum and the mutually distilled key into a final key (e.g., the final key 138 of FIG. 1). The KDF can be a one-time-pad (OTP) algorithm or a conventional symmetric algorithm. Accordingly, in various examples, the final key provided by the KDF for both Alice 504 and Bob 508 can be an OTP key, or a conventional symmetric encryption key. Because Alice 504 and Bob 508 both have the mutually distilled key, and the same nonce sum (as explained herein), the key updater of Alice 504 and Bob 508 generate the same final key.

Referring back to FIG. 1, as noted, in some examples, the final key 138 is employable to encrypt and decrypt data transmitted between Alice 108 and Bob 112 through the network 104. That is, the final key 138 is employable to encrypt and decrypt data that traverses a classical channel. Moreover, the same mutually distilled key is employable to generate multiple instances of the final key 138. Such keys are employable for encrypting overhead data or traffic for transmission through the network 104. Furthermore, generation of the final key 138 does not require that either the final key 138 or the mutually distilled key (employed to generate the final key 138) be transmitted across a channel (the quantum channel 124 or a classical channel through the network 104). Stated differently, the final key 138 is generated without transmitting an encrypted version of a key (including the final key 138 or the mutually distilled key) or an unencrypted version of the key between two parties of the network 104. Instead, the key updater 128 of both Alice 108 and Bob 112 employs a systematic procedure (methodology) for generating the final key 138. Furthermore, there is no need for elevated privileges to generate the final key 138. That is, each node on the network 104 can be peers that have the same privileges (although in some examples, some nodes on the network 104 are permitted to have elevated privileges).

Additionally, generation of the final key 138 relies on the presence of pre-existing relationships between nodes of the network 104. More specifically, as illustrated in FIG. 3, the KET module 132 executes iterations of the KET. Each iteration of the KET entails both Alice 108 and Bob 112 securely communicating with a particular verifying party 116. Accordingly, in a situation where the mutually distilled key was generated with a spoofer (e.g., "Fake Bob"), this spoofer would not be able to establish the secure communications with the verifying parties 116 during an iteration of the KET. Accordingly, the spoofer (e.g., a compromised node of the network 104) would be detected, and the final key 138 would not be generated.

Figure 5:
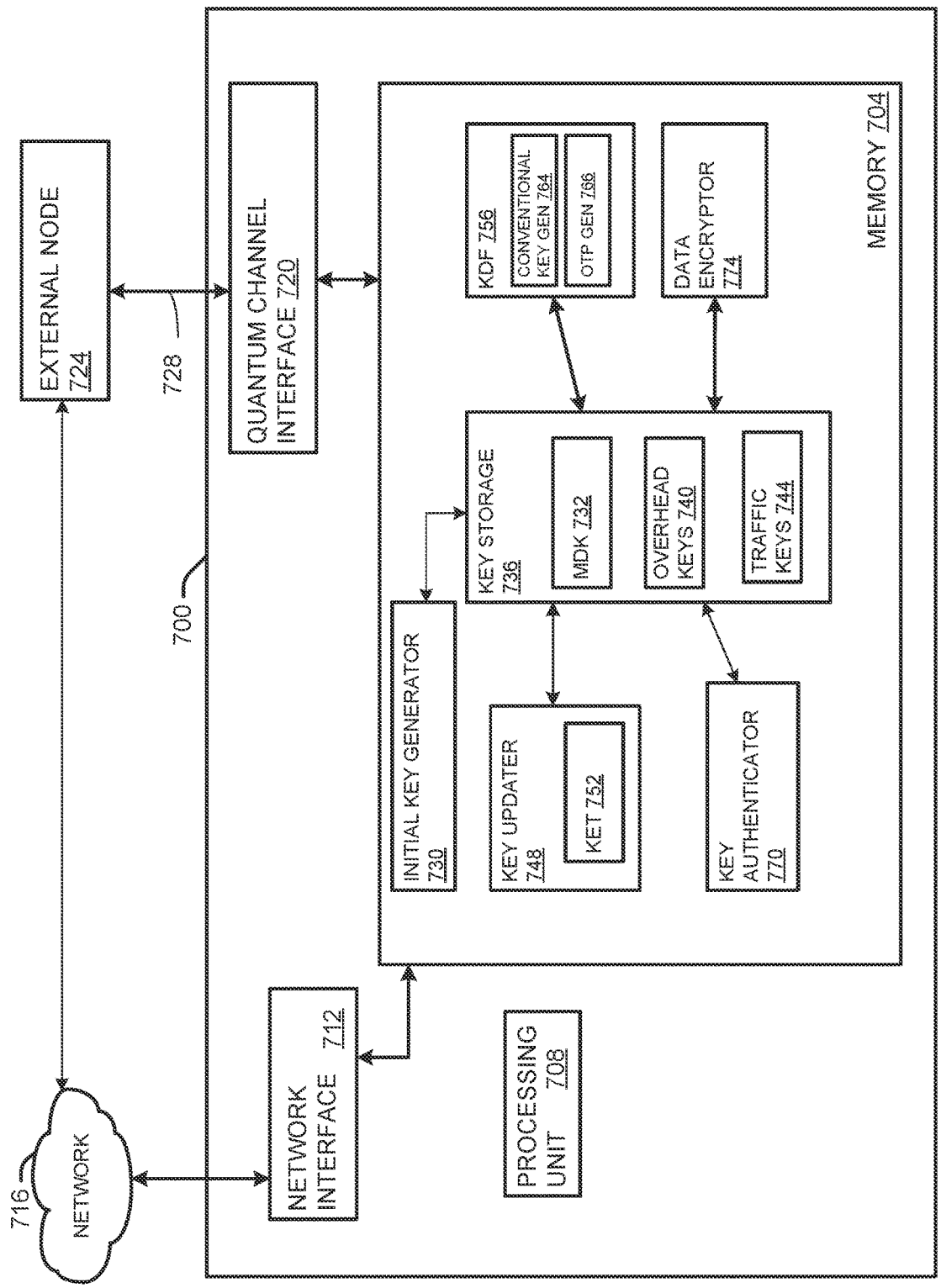
FIG. 5 illustrates an example of a computing platform for generating and authenticating encryption keys.

FIG. 5 illustrates an example of a computing platform 700 for generating and authenticating encryption keys, such as the final key 138 of FIG. 1. The computing platform 700 is employable to implement a node on the network 716, such as the first node 108 (Alice) of FIG. 1, the second node 112 (Bob) of FIG. 1 or one of the verifying parties 116 of FIG. 1. The computing platform 700 can include a memory 704 for storing machined readable instructions and data and a processing unit 708 for accessing the memory 704 and executing the machine-readable instructions. The memory 704 represents a non-transitory machine-readable memory (or other medium), such as random access memory (RAM), a solid state drive, a hard disk drive or a combination thereof. The processing unit 708 can be implemented as one or more processor cores. The computing platform 700 can include a network interface 712 (e.g., a network interface card) configured to communicate with other computing platforms via a network 716, such as a public network (e.g., the Internet), a private network (e.g., a local area network (LAN)) or a combination thereof (e.g., a virtual private network). The computing platform 700 can also include a quantum channel interface 720 for communicating with an external node 724 over a quantum channel 728.

The computing platform 700 could be implemented in a computing cloud. In such a situation, features of the computing platform 700, such as the processing unit 708, the network interface 712 and the memory 704 could be representative of a single instance of hardware or multiple instances of hardware with applications executing across the multiple of instances (e.g., distributed) of hardware (e.g., computers, routers, memory, processors, or a combination thereof). Alternatively, the computing platform 700 could be implemented on a single dedicated server or workstation.

The memory 704 includes software modules that are employable to manage (e.g., generate and authenticate) encryption keys. More specifically, as noted, the computing platform 700 is employable as Alice 108, Bob 112 or a verifying party 116 of FIG. 1. The memory 704 includes an initial key generator 730 that can cooperate with the external node 724 to generate a mutually distilled key 732.

In a second example, (hereinafter, "the second example") it is presumed that the initial key generator 730 has generated the mutually distilled key 732. In some examples, the mutually distilled key 732 is generated with QKD techniques through employment of the quantum channel 728. In other examples, the mutually distilled key 732 is generated with other techniques, such as through a classical channel. In any such example, both the computing platform 700 and the external node 724 have copies of the mutually distilled key 732. To initially authenticate the mutually distilled key, the computing platform 700 and the external node 724 each execute a hashing function on the mutually distilled key and encrypt the resulting hash using another key (previously authenticated) of a key set to each other. The computing platform 700 and the external node 724 then decrypt the encrypted hash and compare the decrypted version with the version transmitted to the other party to verify that the computing platform 700 and the external node 724 have the same mutually distilled key 732. The mutually distilled key 732 can be stored in a key storage 736. The key storage 736 can be implemented as a data structure, such as a table or a database. The key storage 736 also includes keys such as overhead keys 740 and traffic keys 744. The overhead keys 740 are employable to encrypt and decrypt data used for network overhead tasks, such as key verification. Conversely, the traffic keys 744 are employable to encrypt and decrypt general purpose data.

In the second example, periodically and/or asynchronously, a key updater 748 determines that a new key (a new traffic key or a new overhead key) for communicating with the external node 724 is needed. Accordingly, in this situation, the key updater 748 retrieves the mutually distilled key 732 that is employable for communication between the computing platform 700 (e.g., a first party) and the external node 724 (e.g., a second party).

In response to retrieving the mutually distilled key 732, the key updater 748 determines a set of verifying parties operating on the network 716 needed to authenticate the mutually distilled key 732. Each verifying party can be configured in a manner similar to the computing platform 700, such that each verifying party in the set of verifying parties can be implemented as an instance of the verifying parties 116 of FIG. 1. Additionally, the key updater 748 employs a KET module 752 that iteratively executes a KET for each verifying party in the set of verifying parties to determine a nonce sum until the key equivalency test has been executed for each of the verifying parties or until it is determined that at least one node on the network has been compromised.

Each execution of the KET is similar to the method described with respect to FIG. 3. More particularly in the second example, the key updater 748 (executing the KET module 752) executes operations similar to Alice 304 or Bob 308 of FIG. 3 and Alice 504 and Bob 508 of FIG. 4. More specifically, during each execution of the KET in the second example, the KET module 752 of the key updater 748 selects a verifying party of the set of verifying parties to provide a selected verifying party. The KET module 752 hashes the mutually distilled key to provide a hash of the mutually distilled key and encrypts the hash of the mutually distilled key 732 with a first key of a key set retrieved from the key storage 736 for communication between the computing platform 700 and the selected verifying party operating on the network 716 to provide an encrypted hash of the mutually distilled key 732. The key updater 748 transmits the encrypted hash of the mutually distilled key 732 to the selected verifying party. The selected verifying party decrypts the encrypted hash of the mutually distilled key 732 and compares the (decrypted) hash of the mutually distilled key 732 with a (decrypted) hash of the mutually distilled key 732 received from the external node 724. If the selected verifying party determines that the two (decrypted) hashes of the mutually distilled key are equal, the verifying party will generate a nonce value and provide an encrypted first nonce value to the key updater 748 of the computing platform 700.

The key updater 748 receives the encrypted first nonce value from the selected verifying party, and the encrypted first nonce value is only decryptable with a second key of the key set for communication between the first party and the selected verifying party that is retrieved from the overhead keys 740 of the key storage 736. The key updater 748 also receives an encrypted hash of a second nonce value from the external node 724. The encrypted hash of the second nonce value is only decryptable with a first key of a set for communication between the computing platform 700 and the external node 724. In response, the key updater 748 retrieves the first key of a set for communication between the computing platform 700 and the external node 724 from the overhead keys 740 of the key storage 736 of the key updater 748. Additionally, the key updater 748 decrypts the encrypted first nonce value and the encrypted hash of the second nonce value to reveal the first nonce value and the hash of the second nonce value. Additionally, the KET module 752 of the key updater 748 hashes the first nonce value with the hashing function to provide a hash of the first nonce value.

The key updater 748 retrieves the second key of the key set for communication between the computing platform 700 and the external node 724 from the overhead keys 740 of the key storage 736. In response, the KET module 752 encrypts the hash of the first nonce value to provide an encrypted first nonce value that is only decryptable with the second key of the key set for communication between the computing platform 700 and the external node 724. The key updater 748 transmits the encrypted hash of the first nonce value to the external node 724.

The KET module 752 compares the hash of the first nonce value to the hash of the second nonce value. If the hash of the first nonce value is equal to the hash of the second nonce value, the KET module 752 of the key updater 748 adds the first nonce value to the nonce sum. If the hash of the first nonce value is not equal to the hash of the second nonce value, the KET module 752 determines that at least one node on the network 716 has been compromised. In such a situation, the key updater 748 can provide a notification to another node on the network 716, which other node could include the external node 724 and/or one or more verifying parties.

If each iteration of the KET is successfully executed, a nonce value from each of the set of verifying parties is added to the nonce sum. In response, the key updater 748 generates a final key for communication between the computing platform 700 and the external node 724 based on the nonce sum and the mutually distilled key 732. More specifically, in some examples, the key updater 748 executes an XOR operation to combine the nonce sum and the mutually distilled key 732, and provides the results of this combination of the nonce sum and the mutually distilled key 732 to a KDF 756 (a key derivation function) to generate the final key.

In some examples, the KDF 756 includes a conventional symmetric key generator 764 that generates a conventional encryption key as the final key. Additionally or alternatively, the KDF 756 includes an OTP key generator 766 that generates an OPT encryption key as the final key. In yet other examples, the KDF 756 is employable to generate other types of encryption keys (including, but not limited to asymmetric encryption keys) as well and/or in the alternative. The final key is stored in the key storage 736 as either one of the overhead keys 740 or as one of the traffic keys 744.

The computing platform 700 also includes a key authenticator 770 (e.g., an instance of the key authenticator 142 of FIG. 1) that is stored in the memory 704. The key authenticator 770 is employable to enable the computing platform 700 to function as a verifying party (e.g., a verifying party 116 of FIG. 1) during an iteration of a KET for a mutually distilled key generated for other parties, namely a second mutually distilled key. More particularly, in a third example (hereinafter, "the third example"), the computing platform 700 operates as a verifying party to authenticate a second mutually distilled key generated for communication between other parties, namely a first party and a second party. In such a situation, the second mutually distilled key can be generated with QKD techniques over a quantum channel between the first party and the second party. For security purposes, the second mutually distilled key is not transmitted to the computing platform 700.

In the third example, the key authenticator 770 executes operations similar to Charlie 312 of FIG. 3. More particularly, in the third example, the key authenticator 770 receives a first encrypted hash of the second mutually distilled key from the first party through the network 716. The first encrypted hash of the second mutually distilled key is only decryptable with a first key of a key set for communication between the first party and the computing platform 700. The key authenticator 770 receives a second encrypted hash of the second mutually distilled key from the second party that is only decryptable with a first key of a key set for communication between the verifying party and the second party. In response to receiving the first encrypted hash of the second mutually distilled key, the key authenticator 770 retrieves the first key of the key set for communication between the first party and the computing platform 700 from the key storage 736 (e.g., from the overhead keys 740). Accordingly, the key authenticator 770 decrypts the second first encrypted hash of the second mutually distilled key to reveal a first hash of the mutually distilled key. Similarly, in response to receipt of the second encrypted hash of the second mutually distilled key, the key authenticator 770 retrieves the first key of the key set for communication between the second party and the computing platform 700 from the key storage 736 (e.g., from the overhead keys 740). Thus, the key authenticator 770 decrypts the second encrypted hash of the mutually distilled key to reveal a second hash of the second mutually distilled key.

The key authenticator 770 compares the first hash of the second mutually distilled key to the second hash of the second mutually distilled key. If the first hash of the second mutually distilled key is equal to the second hash of the second mutually distilled key, the key authenticator 770 generates a nonce value. Conversely, the key authenticator 770 generates and transmits a notification to other nodes on the network 716 that at least one node on the network 716 has been compromised if the first hash of the second mutually distilled key is not equal to the second hash of the second mutually distilled key. These other nodes can include the first party, the second party and/or another entity.

Continuing with the third example, presuming that the first hash of the second mutually distilled key is equal to the second hash of the second mutually distilled key, the key authenticator 770 retrieves a second key set for communication between the computing platform 700 and the first party from the overhead keys 740 of the key storage 736. Similarly, the key authenticator 770 retrieves a second key set for communication between the computing platform 700 and the second party from the overhead keys 740 of the key storage 736. The key authenticator 770 encrypts the nonce value with the retrieved keys to provide a first encrypted nonce value that is only decryptable with the second key of the key set for communication between the verifying party and the first party and a second encrypted nonce value that is only decryptable with the second key of the key set for communication between the verifying party and the second party. The key authenticator 770 transmits the first encrypted nonce value to the first party and transmits the second encrypted nonce value to the second party. At this point in the third example, the first and second parties can continue the key authentication process without further communication with the computing platform 700.

As noted, the final key generated with the key authentication process is stored in the overhead keys 740 or the traffic keys 744. Thus, at a subsequent time, the final key is employable by a data encryptor 774 that encrypts or decrypts traffic or overhead data, and only the external node 724 possesses a copy of the final key needed to ensure secure communication. Furthermore, using the process of key management described herein, key burn rate can be reduced to about 10% of the overhead needed to generate keys. That is, by employing the key management system described herein, the need to generate new mutually distilled keys is curtailed compared to a conventional key management system.

Figure 6:
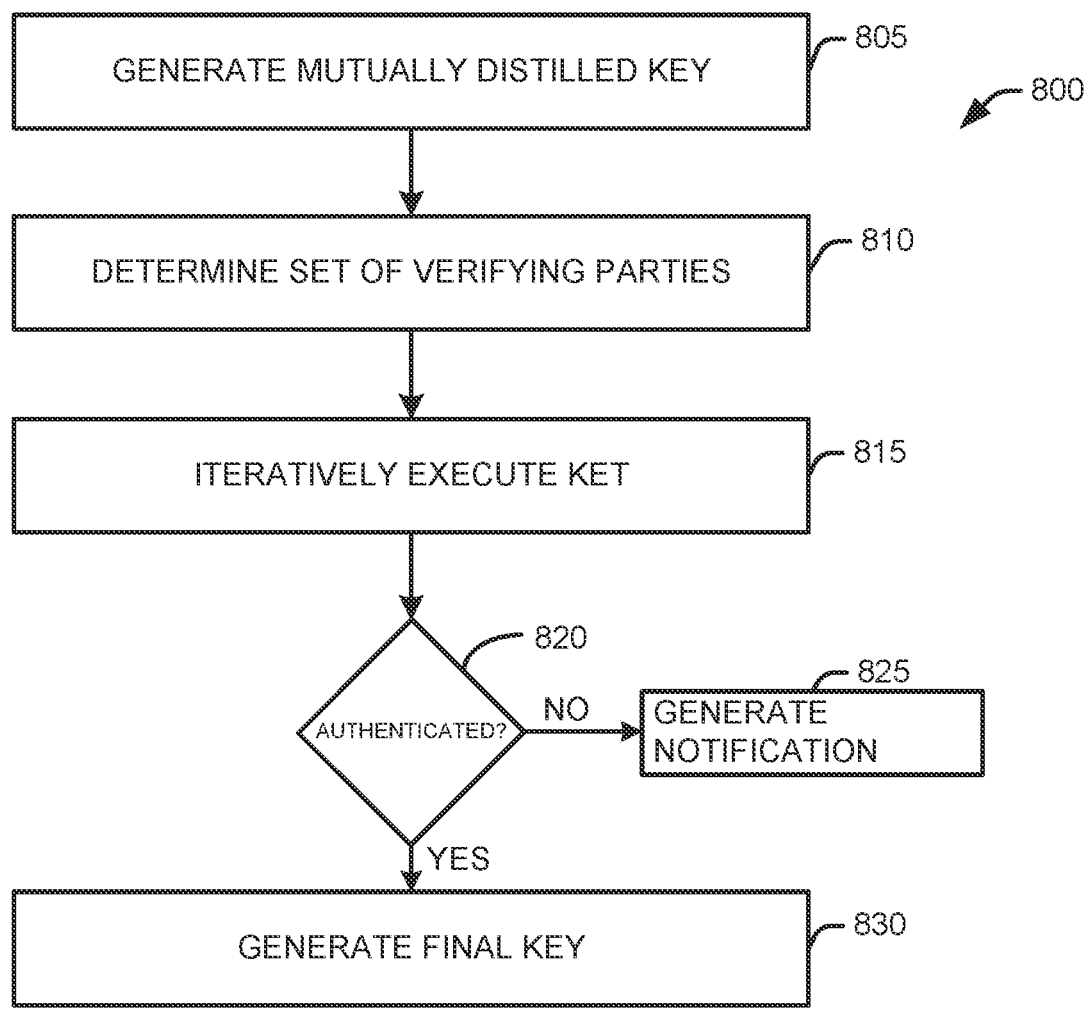
FIG. 6 illustrate a flowchart of an example method for generating a final key for communication between a first party (e.g., "Alice") and a second party (e.g., "Bob").
Figure 7:
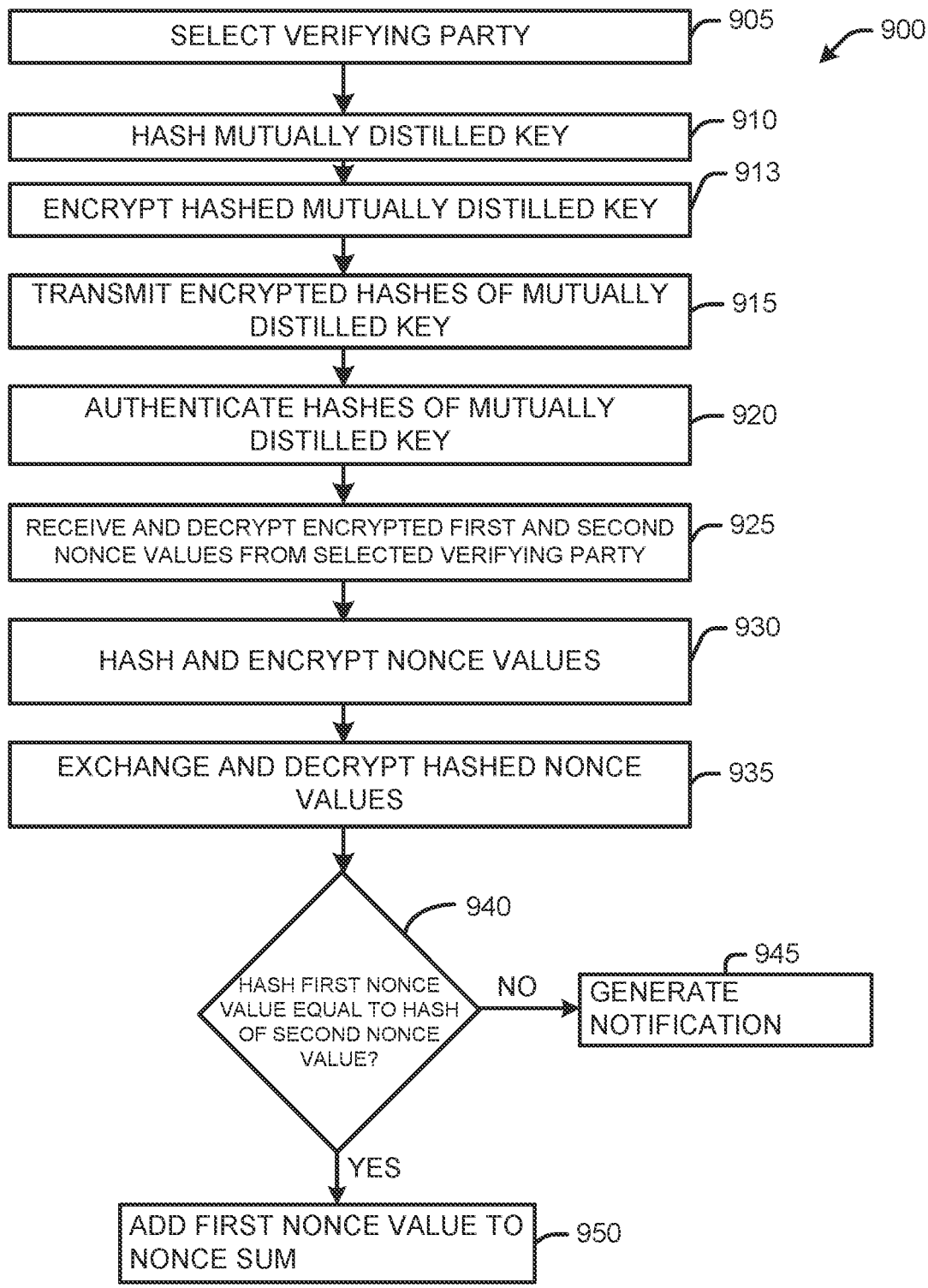
FIG. 7 illustrates a flowchart of an example sub-method that represents a single iteration of a KET.
Figure 8:
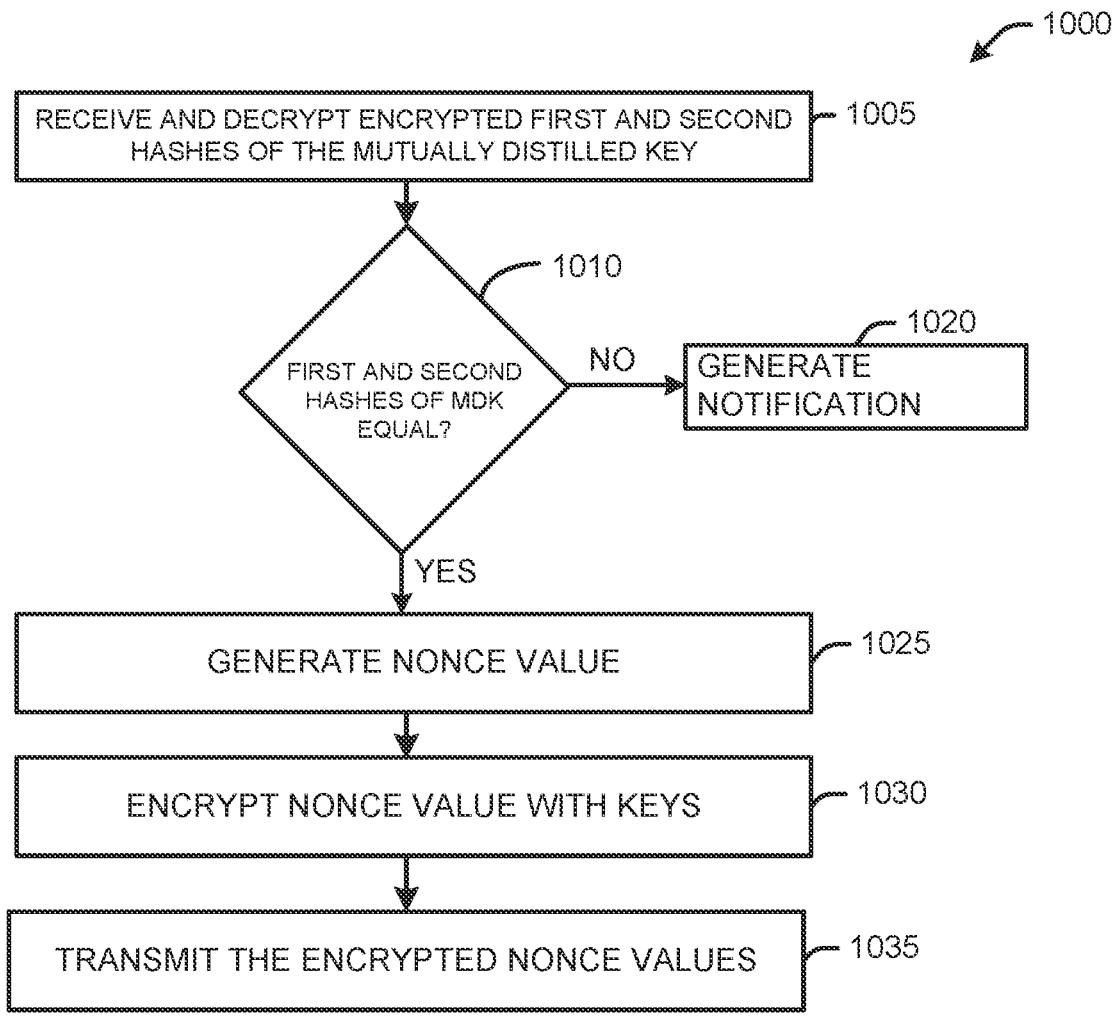
FIG. 8 illustrates a flowchart of an example sub-method employable to execute the authentication of the mutually distilled key at a verifying party for an iteration of a KET.

In view of the foregoing structural and functional features described above, example methods will be better appreciated with reference to FIGS. 6-8. While, for purposes of simplicity of explanation, the example methods of FIG. 6-8 are shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method. The example methods of FIG. 6-8 can be implemented as instructions stored in a non-transitory machine-readable medium. The instructions can be accessed by a processing resource (e.g., one or more processor cores) and executed to perform the methods disclosed herein.

FIG. 6 illustrates a flowchart of an example method 800 for generating a final key for communication between a first party (e.g., "Alice") and a second party (e.g., "Bob"). In such a situation, both the first party and the second party represent nodes (e.g., computing devices) on a network, such as instances of the computing platform 700 communicating on the network 716 of FIG. 5. At 805, the first party and the second party generate a mutually distilled key for communication between the first party and the second party. At 810, the first party and the second party determine a set of verifying parties operating on a network needed to authenticate the mutually distilled key, wherein each verifying party of the verifying parties operates on the network.

At 815, the first party and the second party iteratively execute a key equivalency test for each of the verifying parties to determine a nonce sum until the key equivalency test has been executed for each of the verifying parties of the set of verifying parties or until it is determined that at least one node on the network has been compromised.

At 820, the first party and the second party make a determination as to whether the mutually distilled key has been authenticated from the iterative execution of the KET. If the determination at 820 is negative (e.g., NO), the method 800 proceeds to 825. If the determination at 820 is positive (e.g., YES), the method 800 proceeds to 830. At 825, the first party and/or the second party generate a notification that at least one node on the network may have been compromised. At 830, the first party and the second party generate the final key based on the nonce sum and the mutually distilled key.

FIG. 7 illustrates a flowchart of an example sub-method 900 that represents a single iteration of a KET, such as the operation 810 of FIG. 6. More specifically, the sub-method 900 is executed between the first party, the second party and a verifying party of the set of verifying parties described with respect to FIG. 6.

At 905, a key updater of the first party and/or the second party selects a verifying party from the set of verifying parties to provide a selected verifying party. At 910, the key updater of the first party and the second party hash the mutually distilled key using the hashing function.

At 913, the first party and the second party encrypt the hash of the mutually distilled key with different keys to provide (two different) encrypted hashes of the mutually distilled keys. More particularly, at 913, the key updater at the first party encrypts the hashed mutually distilled key using a first key of a key set for communications between the first party and the selected verifying party to provide a first encrypted hash of the mutually distilled key. Similarly, the key updater of the second party encrypts the hash of the mutually distilled key with a first key of a set of keys for communication between the second party and the selected party to provide a second encrypted hash of the mutually distilled key. At 915, the key updater of the first party transmits the first encrypted hash of the mutually distilled key to the selected verifying party, and the key updater of the second party transmits the second encrypted hash of the mutually distilled key to the selected verifying party.

At 920, the verifying party authenticates the first and second encrypted hashes of the mutually distilled key. Presuming that the authentication is successful, at 925 the key updater of the first party receives a first encrypted nonce value from the selected verifying party. The first encrypted nonce value received at the key updater at the first party device is only decryptable with a second key of the key set for communication between the first party and the selected verifying party. Also at 925, the key updater of the second party receives a second encrypted nonce value that is only decryptable with a second key of the key set for communication between the selected party and the second party. Further at 925, the key updater at the first party and the second party decrypt the first encrypted nonce value and the second encrypted nonce value to reveal a first nonce value and a second nonce value (which will be equal if no node on the network is compromised).

At 930 the key updater of the first party hashes the first nonce value and the key updater of the second party hashes the second nonce value. Also at 930, the key updater of the first party encrypts the hash of the first nonce value with a first key of a key set for communication between the first party and the second party to provide a first encrypted hash of the nonce value. Further at 930, the key updater of the second party encrypts the hash of the second nonce value with a second key of the key set for communication between the first party and the second party to provide a second encrypted hash of the nonce value.

At 935, the first party and the second party exchange and decrypt the first and second encrypted hashes of the nonce value. More specifically, the first party transmits the first encrypted hash of the nonce value to the second party and the second party transmits the second encrypted hash of the nonce value to the first party. Also at 935, the first party receives the second encrypted hash of the nonce value, and decrypts this hash of the nonce value to reveal the hash of the second nonce value. Similarly, at 935, the second party receives the first encrypted hash of the nonce value, and decrypts this hash of the nonce value to reveal the hash of the first nonce value.

At this point, both key updaters of the first party and the second party possess the hash of the first nonce value and the hash of the second nonce value. Thus, at 940 the key updater of the first party and the second party make a determination as to whether the hash of the first nonce value and the hash of the second nonce value are equal. If the key updater at either (or both) of the first party and the second party determines that the hash of the first nonce value is not equal to the hash of the second nonce value, the sub-method 900 proceeds to 950 the determination at 940 is negative (e.g., NO) and the sub-method 900 proceeds to 945. If the key updater at both of the first party and the second party determines that the hash of the first nonce value is equal to the hash of the second nonce value the determination at 940 is positive (e.g. YES) and the sub-method 900 proceeds to 950.

At 945, the key updater of the first party and/or the second party generate a notification that at least one node on the network may have been compromised, and this notification can be transmitted to other nodes on the network, and the sub-method 900 ends. At 950, the key updater of the first party and the second party add the first nonce value or the second nonce value (because they are equal) to the nonce sum, and the sub-method 900 ends. Execution of the operation at 950 indicates that one iteration of the KET has been successfully completed.

FIG. 8 illustrates a flowchart of an example sub-method 1000 that is employable to execute the authentication of the mutually distilled key at 920 of FIG. 7. The operations of the sub-method 1000 are executed by a key authenticator of a verifying party (e.g., a computing device), that has been selected during an iteration of the KET such as an instance of the verifying parties 116 of FIG. 1.

At 1005, the verifying party receives and decrypts first and second encrypted hashes of the mutually distilled key from both the first party and the second party. More specifically, at 1005, the key authenticator of the verifying party receives and decrypts the first encrypted hash of the mutually distilled key from the first party to reveal the first hash of the mutually distilled key. Additionally, at 1005, the key authenticator of the verifying party receives and decrypts the second encrypted hash of the mutually distilled key from the second party to reveal the second hash of the mutually distilled key.

At 1005, the key authenticator of the verifying party compares the first hash of the mutually distilled key and the second hash of the mutually distilled key to make a determination. If the first hash of the mutually distilled key is not equal to the second hash of the mutually distilled key, the determination at 1010 is negative (e.g., NO), and the sub-method 1000 proceeds to 1020. If the first hash of the mutually distilled key is equal to the second hash of the mutually distilled key, the determination at 1010 is positive (e.g., YES), and the sub-method 1000 proceeds to 1025. At 1020, the key authenticator of the verifying party generates a notification that at least one node on the network may have been compromised, and transmits this notification to another node on the network, and the sub-method 1000 ends.

At 1025, they key authenticator generates a nonce value. At 1030, the key authenticator encrypts the nonce value with different keys. More specifically, at 1030, the key authenticator of the verifying party encrypts the nonce value with a key of a key set for communication between the first party and the verifying party to provide a first encrypted nonce value. Additionally, at 1030, the key authenticator of the verifying party encrypts the nonce value with a key of a key set for communication between the second party and the verifying party to provide the second encrypted nonce value. At 1035, the key authenticator transmits the first encrypted nonce value to the first party and the second encrypted nonce value to the first party. Execution of the operation at 1035 indicates that the authentication of the mutually distilled key is successful from the point of view of the verifying party.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A non-transitory machine readable medium having machine executable instructions comprising a key updater for a first party operating on a network that:
   generates a mutually distilled key for communication between the first party and a second party;
   determines a set of verifying parties operating on the network needed to authenticate the mutually distilled key, wherein each verifying party of the set of verifying parties operates on the network;
   iteratively executes a key equivalency test for each verifying party in the set of verifying parties to determine a nonce sum until the key equivalency test has been executed for each of the verifying parties in the set of verifying parties or until it is determined that at least one node on the network has been compromised; and
   generates a final key for communication between the first party and the second party based on the nonce sum and the mutually distilled key if the key equivalency test was successfully executed for each verifying party of the set of verifying parties.

2. The non-transitory machine readable medium of claim 1, wherein for each iterative execution of the key equivalency test, the key updater:
   selects a verifying party of the set of verifying parties to provide a selected verifying party;

receives a first encrypted nonce value from the selected verifying party, wherein the first encrypted nonce value is only decryptable with a first key of a key set for communication between the first party and the selected verifying party;

receives an encrypted hash of a nonce value from the second party, wherein the encrypted hash of the nonce value is only decryptable with a first key of a key set for communication between the first party and the second party;

decrypts the first nonce value and the encrypted hash of the nonce value to reveal a first nonce value and the hash of a second nonce value;

hashes the first nonce value to provide a hash of the first nonce value; and adds the first nonce value to the nonce sum if the hash of the first nonce value is equal to the hash of the second nonce value or determines that at least one node on the network has been compromised if the hash of the first nonce value does not equal the hash of the second nonce value.

3. The non-transitory machine readable medium of claim 2, wherein the key updater for the first party further:

hashes the mutually distilled key to provide a hash of the mutually distilled key;

wherein for each iteration of the key equivalency test, the key updater for the first party further:

encrypts the hash of the mutually distilled key with a second key of a key set for communication between the first party and the selected verifying party operating on the network to provide an encrypted hash of the mutually distilled key; and transmits the encrypted hash of the mutually distilled key to the selected verifying party.

4. The non-transitory machine readable medium of claim 3, wherein for each iteration of the key equivalency test, the key updater for the first party further:

encrypts the hash of the first nonce value to provide an encrypted first nonce value that is only decryptable with the second key of the key set for communication between the first party and the second party; and transmits, to the second party, the encrypted hash of the first nonce value that is only decryptable with the key set for communication between the first party and the second party.

5. The non-transitory machine readable medium of claim 4, wherein the final key is generated without transmitting an encrypted version of a key or an unencrypted version of the key between two parties of the network.

6. The non-transitory machine readable medium of claim 1, wherein the mutually distilled key is generated with quantum key distribution (QKD) techniques over a quantum channel between the first party and the second party.

7. The non-transitory machine readable medium of claim 6, wherein the machine readable instructions further comprises a data encryptor that:

encrypts data using the final key to provide encrypted data; and transmits the encrypted data to the second party through a classical channel between the first party and the second party.

8. The non-transitory machine readable medium of claim 1, wherein there are at least three different verifying parties in the set of verifying parties.

9. The non-transitory machine readable medium of claim 1, wherein each of the first party, the second party and the verifying parties of the set of verifying parties operate on computing devices.

10. A system for updating a key comprising:

a non-transitory memory having machine readable instructions; and a processing unit for accessing the machine readable instructions, the machine readable instructions comprising:

a key authenticator for a verifying party to verify a mutually distilled key generated for communication between a first party and a second party that:

receives a first encrypted hash of the mutually distilled key from the first party that is only decryptable with a first key of a key set for communication between the first party and the verifying party;

receives a second encrypted hash of the mutually distilled key from the second party that is only decryptable with a first key of a key set for communication between the verifying party and the second party;

decrypts the first encrypted hash of the mutually distilled key to reveal a first hash of the mutually distilled key;

decrypts the second encrypted hash of the mutually distilled key to reveal a second hash of the mutually distilled key;

encrypts a nonce value with different keys to provide a first encrypted nonce value that is only decryptable with a second key of the key set for communication between the verifying party and the first party and a second encrypted nonce value that is only decryptable with a second key of the key set for communication between the verifying party and the second party if the first hash of the mutually distilled key is equal to the second hash of the mutually distilled key; and transmits a notification to the first party and the second party that at least one node on a network has been compromised if the first hash of the mutually distilled key is not equal to the second hash of the mutually distilled key.

11. The system of claim 10, wherein the key authenticator for the verifying party transmits the first encrypted nonce value to the first party and transmits the second encrypted nonce value to the second party.

12. The system of claim 10, wherein the mutually distilled key is generated with quantum key distribution (QKD) techniques over a quantum channel between the first party and the second party.

13. The system of claim 10, wherein the mutually distilled key is verified without transmitting an encrypted version of a key or an unencrypted version of the key between two parties of the network.

14. The system of claim 11, wherein the first key and the second key of the key set for communication between the verifying party and the first party are symmetric keys.

15. A method for verifying a key comprising:

generating, by a first computing device for a first party and by a second computing device for a second party a mutually distilled key for communication between the first party and a second party;

determining, by the first computing device and the second computing device, a number of verifying parties operating on a network needed to authenticate the mutually distilled key, wherein each verifying party of the verifying parties operates on the network;

iteratively executing, by the first computing device and the second computing device, a key equivalency test for each of the verifying parties to determine a nonce sum until the key equivalency test has been executed for each of the verifying parties or until it is determined that at least one node on the network has been compromised, wherein for each iteration of the key equivalency test, the first computing device and the second computing device:

select a verifying party of the verifying parties to provide a selected verifying party;

receive a first encrypted nonce value from the selected verifying party, wherein the first encrypted nonce value received at the first computing device is only decryptable with a first key of a key set for communication between the first party and the selected verifying party and the first encrypted nonce value received at the second computing device is only decryptable with a first key of a key set for communication between the second party and the verifying party;

receive an encrypted hash of a nonce value, wherein the encrypted hash of the nonce value received at the first computing device is only decryptable with a first key of a key set for communication between the first party and the second party and the encrypted hash of the nonce value received at the second computing device is only decryptable with a second key of the key set for communication between the first party and the second party;

decrypt the encrypted nonce value and the encrypted hash of the nonce value to reveal a first nonce value and a hash of a second nonce value;

hash the first nonce value to provide a hash of the first nonce value; and add the first nonce value to the nonce sum if the hash of the first nonce value is equal to the hash of the second nonce value or determines that at least one node on the network has been compromised if the hash of the first nonce value does not equal the hash of the second nonce value; and generating, by the first computing device and the second computing device, a final key for communication between the first party and the second party based on the nonce sum if the key equivalency test was successfully executed for each of the verifying parties of the set of verifying parties.

16. The method of claim 15, wherein the final key is generated with a combination of the nonce sum and the mutually distilled key.

17. The method of claim 15, wherein during each iteration of the key equivalency test, the first computing device and the second computing device further:

hash the mutually distilled key to provide a hash of the mutually distilled key;

wherein for each iteration of the key authenticator test, the first computing device and the second computing device further:

encrypt the hash of the mutually distilled key to provide an encrypted hash of the mutually distilled key; and transmit the encrypted hash of the mutually distilled key to the selected verifying party.

18. The method of claim 17, wherein for each iteration of the key equivalency test, the first computing device further:

encrypts the hash of the first nonce value to provide an encrypted first nonce value that is only decryptable with the second key of the key set for communication between the first party and the second party; and transmits, to the second party, the encrypted hash of the first nonce value that is only decryptable with the second key of the key set for communication between the first party and the second party;

wherein for each iteration of the key equivalency test, the second computing device further:

encrypts the hash of the first nonce value to provide an encrypted first nonce value that is only decryptable with the first key of the key set for communication between the first party and the second party; and transmits, to the first party, the encrypted hash of the first nonce value that is only decryptable with the first key of the key set for communication between the first party and the second party.

19. The method of claim 15, wherein the final key is generated without transmitting an encrypted version of a key or an unencrypted version of the key between two parties of the network.

20. The method of claim 15, wherein the mutually distilled key is generated with quantum key distribution (QKD) techniques over a quantum channel between the first party and the second party.

* * * * *